May 17, 1966  G. T. RANDOL  3,251,439
TORQUE-RESPONSIVE CLUTCH MECHANISM FOR DETECTING
INITIAL PLATE CONTACT
Filed Jan. 17, 1964  5 Sheets-Sheet 2
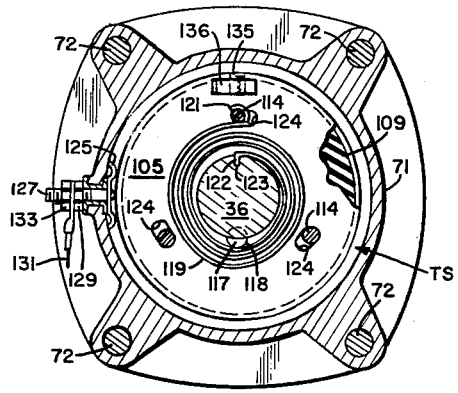
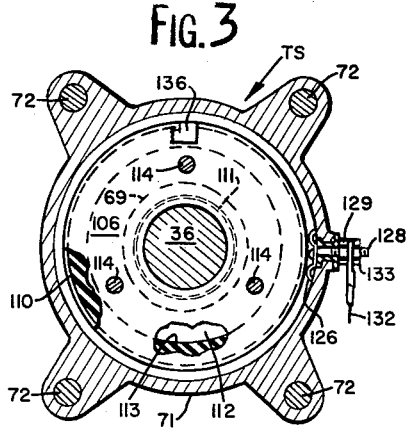
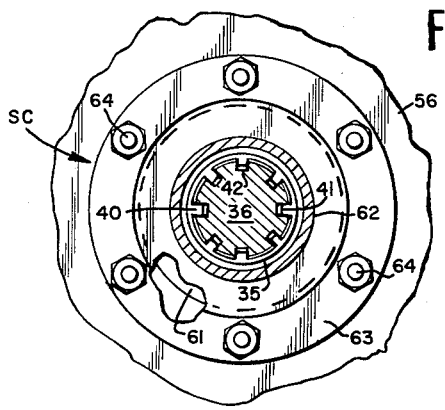
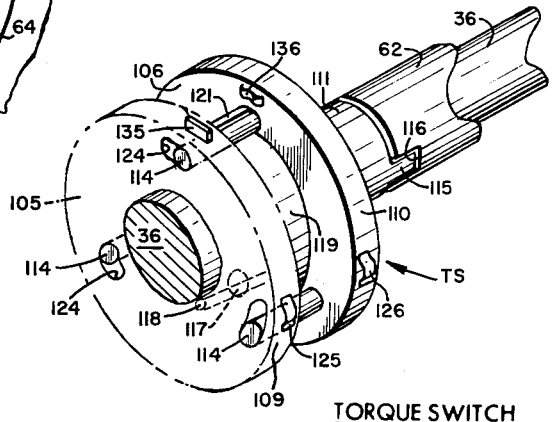
*Inventor*

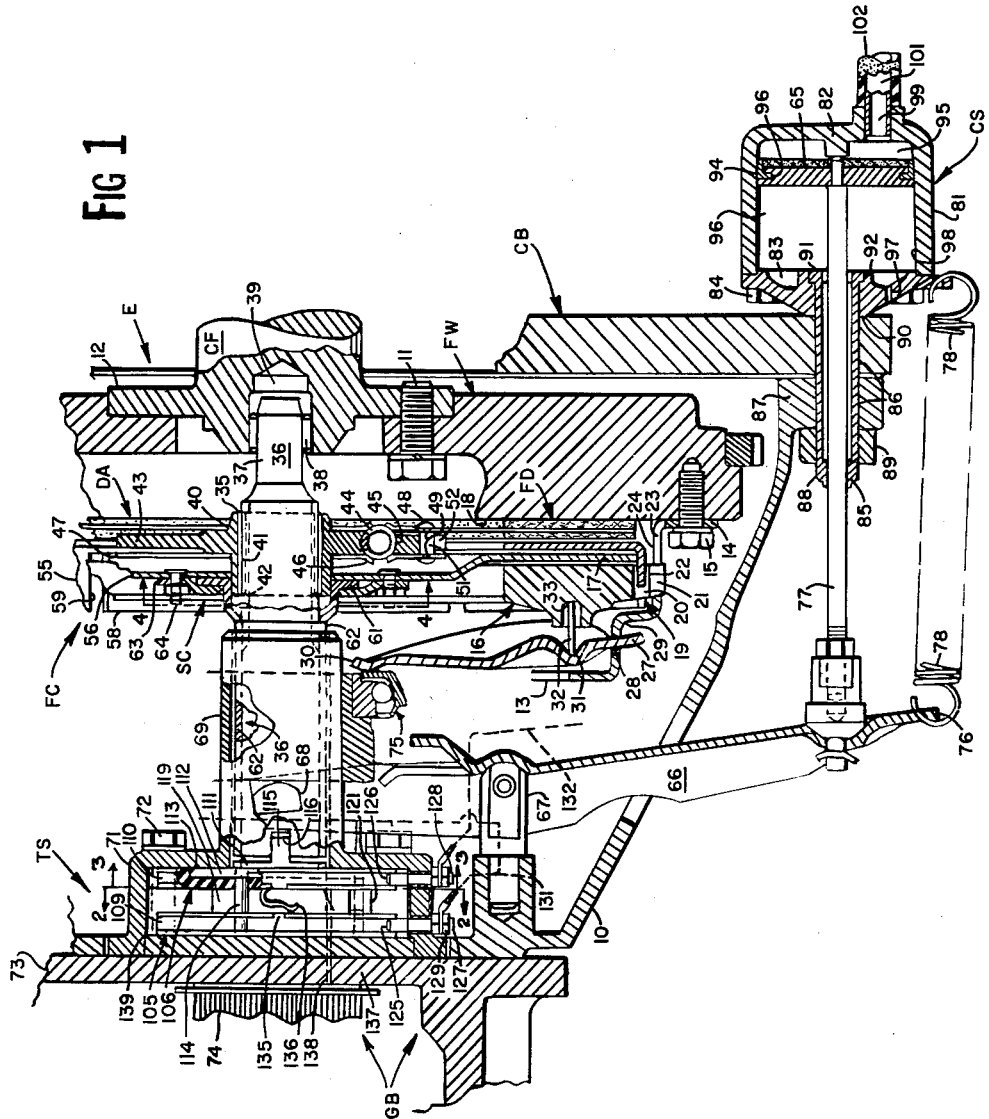

May 17, 1966 G. T. RANDOL 3,251,439
TORQUE-RESPONSIVE CLUTCH MECHANISM FOR DETECTING
INITIAL PLATE CONTACT
Filed Jan. 17, 1964 5 Sheets-Sheet 3

TRANSMISSION IS IN NEUTRAL. Clutch is fully disengaged with engine at idle speed. Solenoid $S^b$ is energized to establish residual, nonactivating pressure of only 7 psi against servo piston by first-stage operation of check valve. Torque switch is open and solenoid $S^a$ is de-energized. Valve land is positioned to shut off pressure flow to servo from engine oil pump. Diaphragm unit is retracted. Low pressure in lubricating line enables closure of interrupter switch.

*Inventor*

May 17, 1966

G. T. RANDOL 3,251,439

TORQUE-RESPONSIVE CLUTCH MECHANISM FOR DETECTING
INITIAL PLATE CONTACT

Filed Jan. 17, 1964

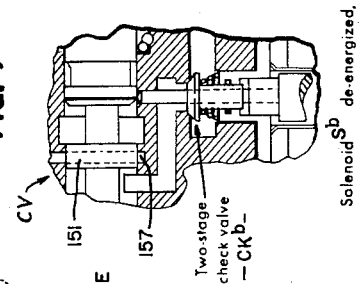

FIG. 9

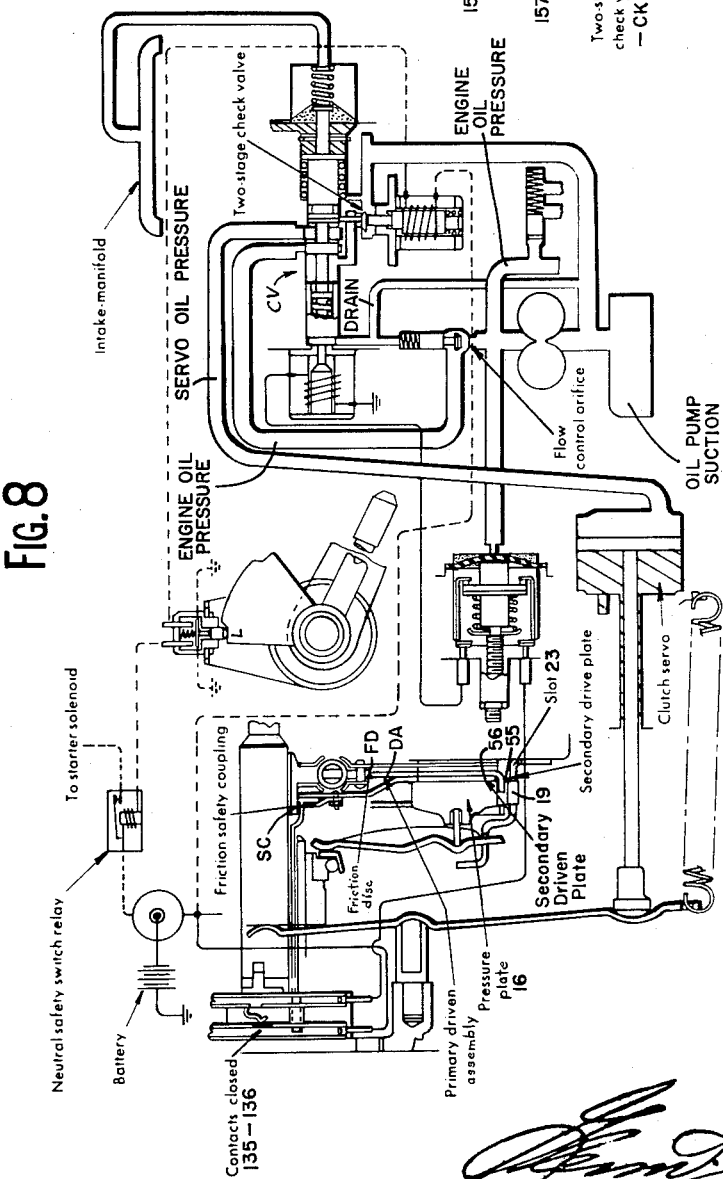

FIG. 8

CRANKSHAFT, FLYWHEEL, PRESSURE PLATE, secondary drive member and clutch cover rotate as unit. Moving shift lever to low-speed position interrupts circuit to solenoid $S^b$ to release armature spring. This induces secondstage operation of check valve to cause pressure buildup against servo piston and initiates slipping engagement of secondary driven plate with driving assembly. Sleeve connected by safety coupling to plate, and connected at its opposite end to one torque switch disc, then closes switch contacts. Switch consists of two discs having electrically conductive surfaces and brushes. Latter in turn energize solenoid $S^a$ to move control land to overlap oil channel and hold pressure in servo. This maintains slipping contact of clutch members, which is established completely automatically without accelerator. Interrupter switch remains closed, which holds torque switch circuit to maintain solenoid $S^a$ energized.

*Inventor*

May 17, 1966  G. T. RANDOL  3,251,439
TORQUE-RESPONSIVE CLUTCH MECHANISM FOR DETECTING
INITIAL PLATE CONTACT
Filed Jan. 17, 1964  5 Sheets-Sheet 5

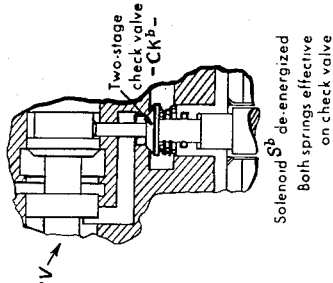

FIG. 11

Two-stage check valve -Ck$^b$-
Solenoid S$^b$ de-energized
Both springs effective on check valve

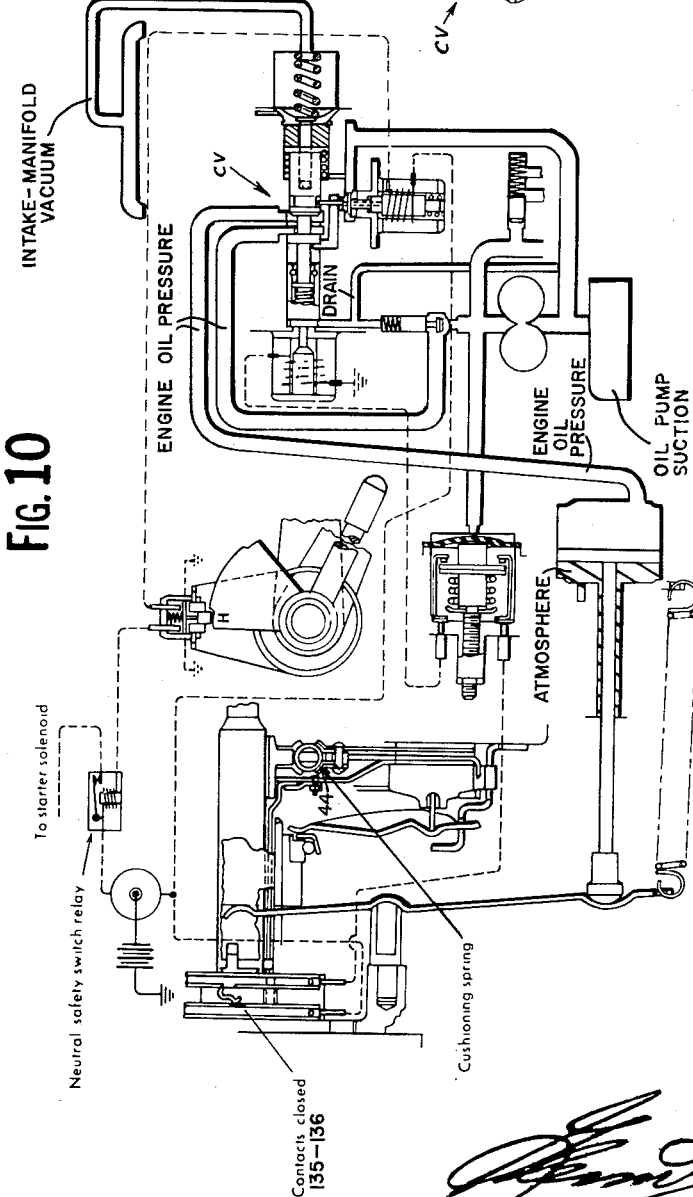

FIG. 10 pressure according to engine speed then acts on servo piston to achieve firm engagement. Interlock is actuated by solenoid S$^b$ to prevent valve land from returning to full clutch-disengaged position when accelerator is released during normal driving.

TO DRIVE CAR, pressure on accelerator increases engine speed and thus builds up oil pressure against servo piston to firmly engage clutch members. Preliminary to such lock-up condition, increase in oil pressure opens interrupter switch, thereby breaking circuit to torque switch and de-energizing solenoid S$^a$. Spring-loaded connection between armature of solenoid S$^a$ and valve land enables diaphragm unit spring to move valve land to position that exposes oil channel directly to pressure line from engine oil pump. Full

Inventor

3,251,439
TORQUE-RESPONSIVE CLUTCH MECHANISM FOR DETECTING INITIAL PLATE CONTACT
Glenn T. Randol, 3 E. 2nd Ave., Loch Lynn, Mountain Lake Park, Md.
Filed Jan. 17, 1964, Ser. No. 338,460
16 Claims. (Cl. 192—3.5)

My invention relates generally to torque-transmitting mechanisms for automotive vehicles and the like, and more particularly to a novel and improved torque-responsive clutch engaging control of the general character disclosed in U.S. Patent 2,624,432 granted to me January 6, 1953, for the master friction clutch conventionally interposed in the drive line between the vehicle driving engine and associated change-speed gearbox, said torque-responsive control being interchangeable with the detector control device disclosed in my copending application Serial No. 247,391 filed December 26, 1962 now Patent No. 3,245,502 dated April 12, 1966, and therefore adapted for operative incorporation in the control system disclosed in said copending application.

Use of a control device such as, for example, a switch or valve for controlling an energizable clutch-actuator adapted to regulate clutch-engagement in accordance with a predetermined torque-transmitting efficiency of the clutch, was first disclosed in my Patent 2,624,432 dated January 6, 1953, and subsequently, a unit was designed and constructed under my supervision in accordance with an improvement disclosed in Patent 2,739,679 granted to me March 27, 1956. This unit was installed in a car and drive-tested during which a serious objection was discovered in that an excessive amount of relative rotative movement between predetermined limits of the primary member (disc) and the clutch output shaft, was required to operate the control device, which in turn introduced too much backlash in the drive line. A further disadvantage was found in the use of the conventional spring-loaded primary driven disc to provide the requisite relative rotative movement aforesaid, which necessarily had to be modified with lighter cushioning springs to sensitize operation of the control device so that the initial clutch plate contact would be monitored to the dirver without unduly loading the engine to start the vehicle, such lighter springs resulted in negating the effectiveness of the normal "cushioning-action," therefore, loss of capability to absorb load shocks imposed on the vehicle drive line. Operation of the tester unit, otherwise satisfactorily proved the practicality of utilizing initial torque transmission by a friction clutch of the type under consideration, for "driver-sensing" of initial plate contact in "slipping" engagement, to enable the driver to smoothly engage the clutch at will under any load and road condition to which the vehicle may be subjected without the likelihood of stalling the engine in getting the vehicle under way from a standing start.

The primary object of the invention is, therefore, to overcome the above noted disadvantages by providing actuating means for the said torque-responsive control device separate from the clutch output shaft, and wherein said means is frictionally-actuated by a secondary driven member under the same frictional coefficient as effective on the associated primary driven member connected directly to the clutch output shaft.

An object importantly related to the foregoing primary objective is to incorporate novel spring means in said torque-responsive device to predeterminately preload the same such that initial clutch plate contact is effective to actuate said actuating means relatively to said clutch output shaft without imparting no more than "creeping" movement to the vehicle, and preferably no movement at all to the vehicle.

Another object importantly related to the above primary object of my invention is to provide new and novel rotatable driving and driven clutch mechanism comprising three driving members and two driven members frictionally cooperating when engaged to transmit torque from a source of drive-torque to a clutch output shaft, and wherein said clutch members are capable of relative axial displacement with respect to one another, with one of the driven members being characterized by predetermined relative rotational movement with respect to the other driven member in response to initial transmission of torque by the clutch member in slipping engagement to actuate a control device operably associated with a clutch-actuator for controlling disengagement of said clutch members and effecting their engagement, said control device being effective to arrest operative energization of said actuator therefore the engaging-action of the clutch members under influence of said actuator, to prevent driver inadvertence of overloading the source of drive-torque when starting the vehicle.

More specifically, an object of the present invention is to modify a substantially conventional friction clutch in a novel manner with a pair of co-rotatable driving members and a pressure plate co-rotatable therewith, and a primary and a secondary driven member connected to the clutch output shaft and a tubular activating member encircling said shaft, respectively, said driving and driven member cooperating when frictionally-engaged to enable said primary driven member to transmit drive torque via said output shaft directly to an element of the change-speed gearing to propel the vehicle, and to enable said secondary driven member to transmit a portion of said drive torque to said activating member to actuate said torque-responsive control device to operating position of control to establish said clutch members in "slipping" engagement, prior to full lock-up thereof.

An object related to the object next above, is to incorporate between said activating member and secondary driven member, novel safety friction clutch means adapted to enable rotation of the secondary member relative to said tubular member upon said torque-responsive control device being actuated to its operating position aforesaid, and thereby preventing excessive torque application to said control device and possible damage thereto prior to lock-up of the clutch members to effect vehicular drive.

Another salient feature of clutch control provided by my invention over that disclosed in my prior patents above referred to, resides in the novel utilization of a driven secondary friction disc which is spring-loaded and functions independently of the conventional primary drive disc employed in such clutches to drive the vehicle, said secondary disc being adapted to actuate said torque-engaging control to avoid introducing additional backlash in the drive line over and above that normally required for "cushioning" load impact through the clutch by a plurality of damping springs embodied in the primary disc. In this manner the spring load on the control device can be calibrated to the exact amount of relative rotation for actuating the control device in relation to the amount of "slipping" contact to produce the torque required to effect such actuation without adding to the backlash normally present in the primary disc. Upon disengagement of said clutch in response to release of the accelerator, said spring load on the secondary disc reacts to return it to its normal position wherein the torque-engaging device is re-established in its normal position of control in readiness to control another clutching engaging cycle by either halting or retarding the clutch members in their relative positions of initial contact, automatically, so that the driver is aware of the engine torque requirement for starting the vehicle under the given conditions.

Other objects and advantages of my invention will become apparent upon referring to the following detailed description considered with the accompanying drawings wherein like reference characters designate identical parts and assemblies and unidirectional arrowed lines applied to the oil circuits indicate the direction of oil flow therethrough under the given operating conditions, and two-directional arrowed lines indicate a stabilized status of the oil resident in such circuits in the several views in which:

FIGURE 1 is a fragmentary illustration partly schematic of the conventional internal-combustion engine for powering a motor vehicle and the like, and incorporating an hydraulic servo-engageable master clutch and associated electro-vacuum-hydraulic control system therefore embodying my invention, said clutch being shown in horizontal longitudinal section in fully disengaged condition, and the control system including the main control valve for the clutch-servo in normal relative positions, the shift lever switch closed, the interrupter switch closed, the clutch plate-contact detector switch open, the ignition switch closed and the engine idling;

FIGURE 2 is a transverse section taken along the line 2—2 of FIGURE 1 showing one of the pair of torque-responsive switch elements co-rotatable with the clutch output shaft, and which carries the fixed contacts;

FIGURE 3 is another transverse section taken along the line 3—3 of FIGURE 1 showing the other torque-responsive switch element which carries the flexible contact engageable with said fixed contact in response to rotation of said secondary disc relative to said primary disc;

FIGURE 4 is another transverse section taken on an enlarged scale along the line 4—4 of FIGURE 1 showing details of the novel safety friction coupling incorporated between said secondary driven disc and tubular member connected to actuate the aforesaid torque-responsive switch elements relative to each other from normal (open) position to operating "closed" position;

FIGURE 5 is an exploded perspective view of the torque-responsive switch assembly in normal open position;

FIGURE 6 is a schematic illustration of the servo-actuated clutch and associated oil and electric circuits and included components (devices) for controlling said servo, the relative disposition of said control device corresponding to neutral at engine idling speed, the clutch fully disengaged, the interrupter switch closed, clutch plate-contact detector switch open, the shift-lever switch closed thus energizing the solenoid-controlled two-stage check-valve to render first stage operation effective, and the vacuum modulated diaphragm unit under high vacuum energization in fully retracted position, with the energized electrical circuits depicted by solid lines and those de-energized by broken lines;

FIGURE 7 is a fragmentary vertical longitudinal section of the novel two-stage check-valve corresponding to the operating position thereof shown in FIGURE 6;

FIGURE 8 is another schematic illustration similar to FIGURE 6 but showing the change-speed transmission "in-gear" at engine idling speed, the clutch in partial (slipping) engagement, the interrupter switch closed to energize the solenoid-controlled main valve piston to establish slipping engagement of the clutch members, the clutch plate-contact detector switch closed, the shift-lever switch open thus de-energizing the solenoid-controlled check-valve for both stages of its operation to be effective, and the vacuum-modulated diaphragm unit under high vacuum energization in fully retracted position;

FIGURE 9 is a fragmentary vertical longitudinal section of the novel two-stage check-valve corresponding to the operating position thereof shown in FIGURE 8;

FIGURE 10 is another schematic illustration similar to FIGURE 6 but showing the vehicle operating under road load at approximately 30 m.p.h., the clutch firmly engaged, the clutch plate-contact detector switch closed, the shift-lever switch open thus de-energizing the solenoid-controlled check-valve for both stages of its operation to continue effective jointly, the interrupter switch open, and the vacuum-modulated diaphragm unit under low vacuum energization to enable the diaphragm power-spring actuated plunger to act on the main valve piston to effect third stage positioning of the control land relative to its associated fluid channel for conveying pump output pressure directly to said clutch-servo; and FIGURE 11 is a fragmentary vertical longitudinal section of the novel two-stage check-valve corresponding to the operating position thereof shown in FIGURE 10.

Referring now to the drawing, and particularly to FIGURES 1–5 which forms the subject-matter of the present application, there is disclosed a portion of an internal-combustion engine E indicated by fragmentary portions of its crankshaft CF, flywheel FW, and cylinder block CB, in operative association with novel power-operated clutch and controlling means embodying my invention. The flywheel incorporates an hydraulically-engageable friction clutch generally designated FC of substantially conventional construction and operation and which is adapted to connect the engine to the conventional manually-shiftable transmission (gearbox) fragmentarily indicated at GB, and through which the ground wheels of the vehicle are driven at different driving ratios as is well understood in the art.

Hydraulically-engageable friction clutch

As best shown in FIGURE 1, the engine-drive clutch FC is operatively incorporated on the flywheel FW which may be termed in the broader patent sense a "friction engaging device," said clutch being enclosed by a housing 10 which also encloses the flywheel, the latter being co-rotatable with the crankshaft CF by means of cap screws 11 which secure the rear flanged end 12 of the crankshaft to said flywheel. The rear face of the flywheel has mounted thereon a centrally apertured cup-shaped backing or cover plate 13 having an annular outstanding flange 14 defining its forward open end contiguous to said face, said flange being secured to the flywheel face by means of cap screws 15 or otherwise, said plate having mounted thereon a movable pressure member (plate) 16 characterized by an annular friction face 17 on the side confronting a complemental friction face 18 in the rear face aforesaid of the flywheel. The periphery of said pressure plate 16 is defined by a plurality of radially projecting lugs 19 which have a normal width base 20 at the periphery of said plate, and an outer terminating narrower portion 21 to provide opposed shoulders 22 therebetween. The narrow portions of these lugs project through elongated longitudinal openings (slots) 23 formed in the cylindrical wall 24 of the cover plate 13 so that the shoulders 22 are disposed contiguous to the confronting marginal portions on opposite sides of said slots 23 as shown in FIGURE 1, to radially stabilize the pressure plate 16 in coaxial relationship to the axis of the clutch assembly, and to lock said pressure plate to the cover plate for co-rotation and accommodate relative axial movement therebetween for operation of the pressure plate to engage and disengage the clutch FC as is understood. The pressure plate 16 is actuatable by a plurality of radially disposed clutch-operating levers 26 (usually three in number in circumferentially spaced relation) and which have their outer end portions 27 pivotally mounted in transverse slots 28 respectively provided in a radially offset portion 29 of the cylindrical wall 24 of the cover plate 13, and intermediate the aforesaid pivotal connection, and inner free end portions 30, said levers are pivotally connected at 31 as by means of a strut 32 to the pressure plate 16 at 33 whereby pressure applied to the free inner ends of said levers rotates them clockwise as viewed in FIGURE 1, on their outer pivoted ends to move the pressure plate 16 toward the flywheel friction surface 18 to engage the clutch as is understood. The mechanism comprising the pressure plate 16, levers 26 and associated structure may be termed in the broader patent sense as "means for applying engaging force" to engage said clutch FC.

A primary clutch driven disc assembly generally designated DA is slidably splined at 35 to the clutch output (driven) shaft 36 for co-rotation therewith, said splined formation being disposed adjacent the forward reduced shaft extension 37 which is piloted in a preferably roller-type bearing 38 nested in a complemental concavity 39 formed in the flanged end of said crankshaft best shown in FIGURE 1. This disc assembly is conventional in all respects and comprises a central hub 40 internally splined at 41 to engage complemental external splines 42 defining the aforesaid splined formation on said output shaft 36, and thereby relative axial floating movement therebetween is provided without interrupting co-rotational movement thereof, said hub being characterized by an annular outstanding flange 43. A friction disc FD is mounted on said hub to one side of said flange by means of a plurality of normally compressed coil-type cushioning springs 44 (usually six in number) which are nested respectively in a corresponding number of normally registering rectangular openings 45 provided in radially offset relation to the axis of said output shaft 36, in a portion 46 of the disc, said flange and a balance ring 47 mounted on the opposite side of the hub flange. The clutch disc and balance ring are further mounted as a unit on said flanged hub 40 by means of a plurality of rivets 48, opposite ends of the latter being reduced to extend through aligned holes 49 in the balance ring and disc, with their normal body portions 51 passing through oversize slots 52 processed in the peripheral marginal portion of said flange 43, whereby the oversize relation of the slots and rivet bodies provides relative rotational movement of limited amount between the flanged hub and connected clutch disc assembly for the cushioning springs to function to absorb load and road shocks transmitted through the drive line to the clutch assembly FC thus contributing smooth engagement of the clutch.

Coaxially positioned between said pressure plate 16 and primary disc assembly DA are a secondary driving member 55 and a secondary driven disc 56. The secondary driving member is provided with a central circular opening 57 which is freely occupied by the hub flange 43, the periphery of said driving member being defined by a rearwardly extending horizontal flange 58 normal to said disc proper as shown, said flange being processed with a plurality of circumferentially spaced longitudinal slots 59 which are adapted to receive, respectively, the base portion 20 of said lugs 19 for co-rotational movement of said driving member 55 and said pressure plate 16 and accommodate relative axial movement therebetween. The secondary driven disc is rotatably mounted on the rearwardly extending portion of the hub 40. Juxtaposed in coaxial relationship to the central portion of said secondary driven disc is the outstanding flanged end 61 of a tubular rotatable switch activating member 62 through which the intermediate smooth portion of the output shaft 36 passes. A clamp ring 63 overlies the rear face of the aforesaid flanged end 61, and is adapted to frictionally clamp the flanged end against the confronting face portion on the secondary driven disc 56 to produce a "safety" friction coupling SC between the tubular member and said disc 56. A plurality of circumferentially spaced bolts 64 which pass through the driven disc 56 and clamp ring, serves to apply the required tension on the clamp ring to establish the desired frictional co-efficient in said coupling. That is to say, the amount of torque impressed on said driven disc 56, to rotate the latter relatively to said tubular member. This "safety" friction coupling serves an important function in the present invention, which will be described in greater detail in the course of the description to follow.

Accordingly, it is seen that the aforesaid friction working surfaces 17, 18 on the pressure plate 16 and flywheel FW are capable of impinging complemental working faces on the interposed primary disc assembly DA, secondary driving member 55 and secondary driven disc 56 under pressure-plate actuation by the servo-piston 65 of an hydraulic clutch-servo designated CS best demonstrated in FIGURES 1, 6, 8 and 9, whereby the flywheel and pressure plate are frictionally locked to the primary disc assembly, secondary driving member and secondary driven disc to rotate as a unit for the transmission of engine drive-torque to the associated gearbox GB and drive line connected dirigible wheels of the vehicle.

A throw-out yoke (lever) 66 is pivotally mounted intermediately on the clutch housing by means of an interconnecting strut 67, the inner end portion of said lever being provided with a pair of spaced shoes 68 which straddle-mount an elongated support sleeve 69 which projects forwardly from an integrated cup-shaped housing 71 having a cylindrical hollow said housing being mounted at its counterbored open end by means of cap screws 72 on the clutch side of the gearbox end wall 73. The intermediate portion of the clutch output shaft 36 freely passes through the sleeve 69 as shown into the gearbox GB for connection with the drive pinion 74. The aforesaid shoes are engageable with a thrust bearing 75 slidably carried by the forward end portion of said sleeve as shown, with the forward opposite side of said thrust bearing being adapted to act simultaneously on the inner free end portions 30 of the clutch-operating levers 26 and thereby actuate the pressure plate 16 toward the engine flywheel FW to clamp the friction faces on the primary disc assembly DA, secondary driving member and secondary driven disc therebetween under servo-actuation of the outer free end 76 of the yoke 66, to sequentially rotate the secondary driven disc relatively to the primary disc assembly to actuate a torque-responsive switch TS adapted to retard or halt movement of the clutch-servo CS and thereby correspondingly control the engaging-action of the clutch FC through its initial stage of "slipping" engagement, and to firmly engage the clutch FC at the operator's will for normal vehicular drive as is understood. The outer end of the clutch yoke is connected to the servo-piston 65 by means of a piston push-rod 77, and an expansion coil spring 78 is adapted to react between the outer end of said clutch yoke and a fixed portion on the clutch-servo or mounting therefor to oppose servo-actuation of said clutch FC into engaged condition, and therefore said spring serves upon minimal non-activating pressure present in the clutch-servo, to retract the clutch yoke 66 and connected servo-piston and rod to normal positions wherein the clutch FC is fully disengaged as shown in FIGURES 1 and 6.

*The hydraulic clutch-servo*

The clutch-servo CS is conventional in construction and operation, said servo in the broader patent sense may be termed "means operatively energizable" for controlling the engaging action of said clutch FC, and comprises the aforesaid piston 65 reciprocable in a cylinder 81 closed at one end by an integrated wall 82, and the open end thereof being closed by a fluidtight detachable cover (plate) 83 secured to the cylinder by cap screws 84 or otherwise. The outer central portion of the cover 83 is provided with a cylindrical tubular extension 85 which slidably supports the piston-rod 77 as shown and also serves as the means for mounting the servo unit on the side of the automobile engine by projecting through coaxial longitudinal holes 86 processed in a flanged portion 87 of the clutch housing and cylinder block CB best demonstrated in FIGURE 1. The rear free end portion of said extension is externally threaded at 88 for reception of a lock-nut 89 to draw the marginal portion 90 of the servo cover into firm engagement with the engine block flange as shown thus rigidly mounting the clutch-servo CS on the engine block in operative position to cooperate with the free end of the clutch throw-out lever 66 to operate the clutch FC as is understood. The aforesaid extension 85 may be integral with the cover 83 or separate as shown with a forward annular flange 91 nested in a complemental recess 92 formed in the inner side of said cover and defining the inner open end of said tubular extension. The piston 65 is suitably attached to the forward end of the piston-rod 77 for reciprocable movement within the servo-cylinder 81, as a unit. The periphery of the servo-piston is defined by an annular channel 93 which carries a lip-type pressure seal 94 exposed to the variable working chamber 95 between said piston and end wall 82, and the opposite side of said piston defines with the inner side of the detachable cover 83, a constant (atmospheric) pressure chamber 96 continuously vented to the atmosphere via vent hole 97 in said cover, and with which a filter device may be associated to prevent dust, etc., from entering the interior of said servo-cylinder 81 with possible damage to the working surfaces between said piston and inner finished surface 98 of said cylinder. A passage 99 is provided through an outstanding boss integral with the end wall 82, said passage terminating exteriorily of the cylinder in a rigid tubular fitting 101 which receives one end of a flexible conduit 102 for conducting pressure flow into the working-chamber 95 of the clutch-servo CS.

*Torque-responsive control switch for detecting initial clutch plate contact*

A control device disclosed herein as a torque-controlled switch TS is best shown in FIGURES 1, 2, 3 and 5, and reference is now made to these figures. The torque-sensitive switch TS comprises: two relatively rotatable contact disc elements 105, 106 mounted in said housing 71 in circularly spaced relation to the hollow wall, said discs being coaxially apertured and preferably made of insulative material. As shown in FIGURES 1 and 5, the clutch output shaft 36 is formed with an enlarged diameter portion which produces with the normal intermediate portion of said shaft, an annular external shoulder at 107 against which the left marginal portion on the disc 106 defining the aperture therethrough is juxtaposed. The aforesaid enlarged diameter portion of shaft 36 extends rearwardly from said disc 106 through the aperture in the disc 105 and thence through the end wall bearing (not shown) of the gearbox GB for connection to the aforesaind transmission drive pinion. The aforesaid disc contacts are axially spaced, and are provided with collector rings (bands) 109, 110, respectively, embedded in the peripheral surfaces thereof. A hub-like element 111 having an integral circular flange 112 confined in a complemental recess 113 formed in the right side of the disc 106. This flange is fixed to said disc 106 by means of three circumferentially spaced pins 114 which are fast at one end on said flange and projects through complemental holes through the wall of the aforesaid recess toward the other axially spaced disc 105, said hub element being formed with a pair of diametrically opposed end projections 115 which are adapted to engage a complemental pair of longitudinal slots 116 indented in the confronting rear end of the aforesaid tubular member 62 to lock the hub element 111 and disc 106 for co-rotational movement, said projections and slots cooperating to produce a "dog-clutch connection" between said switch actuating member 62 and hub element 111. As shown in FIGURE 1, the ends of the projections 115 are normally spaced from the bottoms of their cooperating slots 116 to accommodate relative axial movement between said actuating member 62 and hub element 111 to compensate for axial adjustments of the clutch frictional members when engaging and disengaging.

A steel ball 117 embedded in the enlarged diameter portion of shaft 36 cooperates with a complemental arcuate slot 118 formed in the wall of the aperture in the disc 105 aind coextensive with the length thereof as shown in FIGURES 2 and 5. This ball-and-slot connection connects the disc 105 to the shaft 36 for co-rotation therewith and also enables this disc to assume its free axial rotative position within the hollow of the housing 71. Thus, it is seen that the tubular member 62 is locked by the dog-clutch connection to the disc 106 to rotate the same in unison, and the shaft 36 is locked to the disc 105 by means of the ball-and-slot connection to rotate in unison.

The axial space between said discs 105, 106 as shown in FIGURE 1, is partially occupied by a flat normally tensioned torsional (wrap) spring 119 which serves to stabilize the two discs in their spaced rotational positions within the hollow of the housing 71.

The outer end 121 of spring 119 is looped around one of the pins 114 and the inner end 122 thereof is anchored in a longitudinal slot 123 formed in the enlarged diametered portion of the shaft 36. The aforesaid pins 114 cooperate with a like-number of arcuate openings (slots) 124 through the wall of the disc 105, best shown by FIGURES 2 and 5, to produce what may be termed a "lost-motion connection" between the two discs wherein, in the normal rotative relationship thereof, the pins are disposed at one end of their respective openings under normal preloaded status of the torsional spring 119, the arcuate length of each opening being greater than the diameter of said pins to accommodate relative rotational movement of the disc 106 with respect to the disc 105 between predetermined limits defined by the opposite ends of said openings when engaged by said pins, respectively. Such relative rotation of the discs functioning to increase reaction from the switch return spring 119, and therefore, by varying the preloaded tension of spring 119, movement of the disc 106 relative to the disc 105 will require a corresponding increase or decrease, as the case may be, of actuating torque to operate the torque-sensitive switch TS from normal open position under reaction from said spring 119 to operating closed circuit position under torque-actuation of said tubular member 62.

Riding on said collector rings 109, 110 are a pair of flexible member or brushes 125, 126, respectively, which have insulated threaded terminals 127, 128, respectively, for mounting said brushes on the inner cylindrical surface of the hollow in the housing 71. The threaded portions of the terminals project to the exterior of said housing through suitable insulated openings and are fixed thereto by means of nuts 129. Electrical conductors 131, 132 are connected to said terminals, respectively, by means of lock-nuts 133, said conductor 131 connects to the winding of solenoid S$^a$ via an interrupter switch IS, and the other conductor 132 connects to one end of the winding of the solenoid S$^b$ which controls the two-stage check-valve CK$^b$ in the control system. The other end of the latter solenoid winding is connected to one side of the shift-controlled switch SS. The solenoid S$^a$ is adapted to operate in part "control means" disclosed herein as a "main control valve" comprising a pair of valve elements initially movable as a unit under influence of said solenoid S$^a$ to position a control land carried by one of said valve elements in overlapping relationship with respect to an oil flow control channel communicating with the working chamber 95 in said clutch-servo CS, and thereby interrupting pressurized oil flow to said clutch-servo to enable the oil trapped in said working chamber to stabilize the servo-piston 65 and connected clutch friction members in "slipping" engagement until said one valve element is moved at will relatively to the other valve element to dispose said control land out of overlapping relationship with respect to said oil flow channel to re-establish oil flow communication between the means for supplying pressurized oil (pump) and said clutch-servo whereby the latter becomes operatively effective to operate the clutch friction members into firm co-rotational engagement for maximum torque transmitting efficiency.

The collector ring 109 is provided with a rigid contact 135, and the other ring 110 is provided with a flexible contact 136 in confronting relationship to said rigid contact whereby rotation of the disc 105 relative to the disc 106 mounted on the output shaft 36, displaces the flexible contact from normally spaced (open) position with respect to the inflexible contact as shown in FIGURES 1, 5 and 6, to engage the latter contact as shown in FIGURE 8 to close said contacts and thereby complete the circuit controlled thereby with consequent energization of the conductor 131 and connected winding of solenoid $S^a$ to retract its armature to the position of FIGURE 8 wherein the main valve control land is disposed in overlapping relationship with respect to the co-operating fluid channel in the main valve body leading to the clutch-servo CS. Under these circumstances, the oil flow under pressure from the engine-driven pump to the clutch servo-piston is interrupted to enable the latter to halt the frictional clutch members aforesaid in "slipping" engagement, automatically, or if the fluid channel is only partially overlapped, movement of said clutch members into engagement would be retarded, so that firm engagement can be effected by the driver manipulation of the accelerator at will.

A circular bearing and oil retaining plate 137 is provided between the disc 105 and gearbox end wall 73. A central opening 138 is provided in this plate through which the enlarged diameter portion of the shaft 36 passes, with the peripheral marginal portion of the plate being confined between an internal annular shoulder 139 produced by the counterbore in the open end of said housing 71, and confronting face on the clutch side of said end wall, therefore the counterbore is substantially the same length as the thickness of the disc confined therein.

*Operational summary*

Although the manner in which my invention achieves its objectives should be manifest from the foregoing description considered with the drawing, a brief restatement is deemed apropos to insure a clear understanding of the novel coaction of the various elements and components as follows:

The present invention is concerned solely with the novel and improved features of the torque-responsive switch TS including novel actuating mechanism therefor as embodied in the structure of the conventional master friction clutch adapted for automotive use and replacement of the detector switch disclosed in my aforementioned prior copending application. However, it is believed necessary to facilitate understanding the novel interposition of the torque-responsive switch TS in lieu of said detector switch in the electric, vacuum and oil circuit control system, by providing schematic depictions thereof such as FIGURES 6, 8 and 10 which correspond to similar schematics forming part of my above-referred to copending application. The control system disclosed by FIGURES 6, 8 and 10 is identical to the system illustrated in my pending application except that the automatic clutch-engaging device operatively associated with the clutch-servo CS has been deleted, otherwise the control system disclosed by the present application is constructed and operates identically to the disclosure in my copending application. Also, the reference characters used to designate the elements and assemblies of the control system disclosed in my prior pending application are the same as those which identify identical elements and assemblies in the present application except that the electric circuit 131, 132 replaces circiut 118, to facilitate orientation of the function of the torque switch TS.

Therefore, by orienting the function of the torque-responsive switch TS to the control circuit 118 in which the aforesaid detector switch was interposed, the objectives of the present invention should be readily understood and applied commercially by workers in the art to which the invention relates.

The torque-responsive switch TS is actuated to closed-contact position shown in FIGURE 6 by torque applied to the tubular actuating member 62 via said "dog-coupling" and hub element 111 to the switch disc 106 which rotates the latter relatively to the disc 105 connected to the clutch output shaft for co-rotation by the ball-and-slot connection aforesaid. This relative actuation of the switch TS is opposed by the torsional spring 119 and accommodated by the pin-and-slot connections 114, 124 between said switch discs 105, 106.

The torsional spring between the switch discs provides a special advantage in that it may be selectively preloaded to establish the degree of slipping torque transferal by the secondary driven disc 56 to operate the torque switch to closed position as shown in FIGURE 8. For example, if the installed strength of this spring is relatively heavy, then the clutch members would reach an intensity of slipping contact sufficient to impart possibly "creeping" motion to the vehicle with the vehicle brakes "off" simulating the "slip" characteristic of the conventional fluid-drive coupling. But, if reaction from this spring is relatively lighter when installed, then a correspondingly easy "slipping" engagement between the clutch members would be required for torque switch actuation with no capability of imparting movement to the vehicle with the gearbox GB shifted into a starting-gear position. Accordingly, it is seen that operator inauguration of clutch re-engagement under control of the clutch-servo CS by operating the shift-lever to starting-gear position to interrupt the circuit controlling solenoid $S^b$ which results in the two stages of the associated check-valve $CK^b$ becoming jointly operative as described in detail in my prior copending application, is effective to render the torque switch TS operative to close the electric circuit to the solenoid $S^a$ which in turn becomes energized and thereby displacing the main valve control land 151 in overlapping relation, or optionally in partially lapping relation, to its cooperating fluid channel 157 in the valve body communicating oil pressure to clutch-servo CS, to halt or retard, respectively, clutch member movement into engagement under servo-actuation initiated by the driver in the manner stated above. It, therefore, follows that the same frictional coefficient is effective between the clutch members when disposed in "slipping" engagement but since torque applied to the secondary driven member 56 can effectuate actuation of the torque switch disc 105 relatively to the disc 106 by overcoming the normally preloaded status of the torsional spring 119, which requires much less torque than required to rotate the primary disc assembly DA to propel the car, the torque switch contacts become engaged to complete the circuit to solenoid $S^a$ with resultant trapping of the oil in the clutch-servo CS and suspension of clutch member actuation thereby into a more firm engagement, thus maintaining the clutch members in "slipping" engagement until the driver depresses the accelerator to increase engine speed therefore proportionately raise oil pressure to operate the interrupter switch IS to interrupt the control circuit between the closed torque switch contacts and solenoid $S^a$ with resultant de-energization of the winding thereof, and simultaneous movement of the control land 151 out of lapping relation with its cooperating fluid channel 157 so that oil pressure from the pump may be directed into the clutch-servo CS to actuate the clutch members into firm engagement for normal vehicular driving.

From the foregoing operational description, it is apparent that the primary disc assembly DA is conventionally functional to propel the vehicle, and that initial torque transferal to both the primary assembly and secondary driven member, is effective to rotate the latter member relatively to the primary assembly to actuate the torque switch TS to complete the circuit in which the interrupter switch IS and solenoid S^a of the main control valve CV are interposed in series. In this manner, pressurized oil to the clutch-servo CS is interrupted by overlapping of the control land 151 and cooperating fluid channel 157 to suspend movement of the clutch members in "slipping" contact relation to provide the driver with physical perception of initial clutch plate contact to enable him to smoothly regulate the clutch members into solid engagement as is understood.

Actuation of the torque switch TS by the rotatable member 62 separate from the clutch output shaft 36, retains the normal backlash tolerance in the drive line between the engine and ground driving wheels, therefore the function of the clutch "damping" springs for absorbing load shock is conventional in all respects.

Special reference is made to the novel "safety" friction coupling SC between the torque switch actuating member 62 and the secondary driven disc 56 which is adapted to limit the function of the latter to torque-switch actuation only thus preventing any drive-line torque from being imposed on the secondary driven disc and torque-switch mechanism actuated thereby. The torque transmittable by the secondary driven disc 56 is determined by the torque-transmitting capability of the coupling SC required to overcome the switch return spring 119 to engage the contacts 135, 136 and thereby closing the torque switch TS. Upon the torque-actuating disc 56 closing the contacts 135, 136 of the torque switch TS, any additional torque which may be impressed on this disc "slips" the said coupling so that the torque switch elements cannot be overloaded with possible damage to the switch structure, thus this coupling is termed a "safety-coupling" since it automatically releases the secondary driven disc 56 to rotate relatively to torque switch element 106 upon the latter being rotated relatively to the switch element 105 to close the contacts 135, 136. As the primary and secondary driven disc become more firmly engaged with their respective driving members under pressure from the clutch-servo CS acting through the clutch pressure plate 16, both driven members may momentarily rotate in unison until under full lock-up pressure from said clutch-servo, and in such case, autamatic release of the secondary driven member to rotate relatively to the switch element 106, prevents any overload being imposed on the latter element after it has been rotated to its closed-contact position shown in FIGURE 8 in unison with said secondary driven disc. Upon the clutch FC being actuated to firm lock-up, engine-torque is transmitted directly to the primary driven assembly DA to the change-speed gearbox GB, thence to the ground wheels of the vehicle to propel the same. Under firm lock-up of the clutch FC for normal vehicular driving, the torque-switch elements 105, 106, switch actuating member 62, secondary driven disc 56, primary disc assembly DA and connected output shaft 36 rotate as a unit, therefore none of the drive-torque utilized for propelling the vehicle is imposed on the torque-switch TS, however, should "slip" occur in the clutch FC such would not damage the torque-switch TS due to the protection afforded it by the coupling SC in preventing any overload being imposed on said switch elements 105, 106.

Use of an independent actuating mechanism for the torque switch TS enables a wide range of varying intensities of "slipping" contact between the clutch friction members for obtaining the desired amount of torque diverted from the clutch output shaft 36 for torque switch actuation, thus the torque switch, rather than the driver, automatically senses when the clutch FC is in "slipping" engagement. The driver cannot overload the engine with consequent possible stalling of the same. Driver "feel" on the accelerator treadle, as an indication of initial clutch engagement, is eliminated since the torque switch TS automatically takes over this critical first-stage operation to bring about firm lock of the clutch at the will of the driver without burdening the engine in response to manually-operating the gearbox shift-lever from neutral to starting-gear position.

Thus, while full clutch engagement, is a function of driver control of the accelerator, initial "slipping" engagement is completely automatic with the driver incapable of inadvertently stalling the engine by not providing sufficient torque at the proper moment, since this latter operation responds to setting the shift-lever in the selected starting-gear position. Such automatic detection of initial "slipping" contact of the clutch friction members being dependent on the degree of frictional coefficient obtaining between said clutch members, therefore functioning as an inherent characteristic of the clutch itself, wear on the frictional facings cannot affect normal actuation of the torque switch TS, and, as mentioned previously, the relative axial movement provided by the "dogclutch connection" between the switch actuating member 62 and hub element 111 rotatable as a unit with the disc 106 compensates for any change in the axial relationship between said element and member as a result of the facings becoming thinner, even up to the point that the facings become worn from the clutch discs themselves. It is the torque initially impressed on the primary and secondary driven members that determines the point of torque switch actuation as defined by the preloaded status of the torque switch return spring 119, that is, such initial torque is graduated in accordance with the degree of slipping contact of said driven members required for torque switch actuation to closed position. If the installed strength of this spring is increased or decreased, the frictional coefficient obtaining in the "safety coupling" SC must be correspondingly modified so that the torque transmittable by this coupling is capable of overcoming the preloaded status of spring 119 for rotation of the switch disc 106 relative to the switch disc 105, but any additional torque applied to the secondary driven disc 56 in excess of that required for torque switch actuation, induces the coupling to "slip" thus preventing any overload being applied to the switch disc 106. Upon firm lock-up of the clutch members to propel the vehicle, torque transmission to the torque-switch TS is negated since the driving mechanism and connected switch discs rotate as a unit. However, should a temporary "slip" of the primary driven disc assembly DA occur during normal driving of the vehicle, the "safety coupling" SC functions instantaneously and automatically to prevent any overload torque from reaching the torque-switch discs 105, 106 by slipping automatically. Upon lock-up drive of the vehicle via the primary disc assembly being resumed, the "safety coupling" SC is automatically deactivated to rotate as a unit with the said switch discs 105, 106 and output shaft 36.

Periodical adjustments, therefore, are not required, it being one of the main objectives of this novel clutch development to produce an automatic clutch responsive to engine operation and shift-lever movements which does not require frequent adjustments to maintain optimum operating efficiency. Since partial engagement is a function of a predetermined degree of torque impressed on the secondary driven member 56, it is contemplated that the only servicing that should ever be required would be the replacement of the primary driven disc assembly DA when its facing become worn too thin for efficient transmission of drive torque. Such limited servicing should occur only every 25,000 to 30,000 miles (two to three years of normal driving), depending, of course, on the driving conditions to which the car is subjected and the mode of driver operation thereof.

The foregoing description is believed to set forth clearly the achieving of the various stated objectives of my invention, and to describe the advantageous results to be derived therefrom.

The preferred embodiment of the invention herein disclosed is believed well calculated to fulfill the objects above stated, however, it should be appreciated that I do not wish such to be limited to the exact construction and/or arrangement of parts shown, since it is obvious that modifications, variations and substitutions may be restored to without departing from the proper scope of fair meaning of the subjoined claims.

Having thus described my invention, I claim:

1. In control mechanism for a friction clutch having a plurality of primary drive and driven elements arranged to provide for transmission of drive-torque when engaged, from an internal-combustion engine drivingly connected to one of said drive elements, to the input shaft of a manually-shiftable gear transmission selectively controllable by a shift-lever, comprising a secondary element interposed in parallel with respect to said primary elements for frictional engagement thereby, means including an energizable actuator operatively related with said clutch for controlling the engaging and disengaging-action of said primary elements; control means having normal and first positions of control and operably related with said actuator for controlling the latter; means operably associated with said control means in normal position for inducing "slipping" engagement of said primary elements in response to manually-operating said shift-lever to a starting-gear position; and a control device operable in response to limited torque transmittable by said secondary element in slipping engagement with said primary element for operating said control means to first position of control wherein operative energization of said actuator is suspended thereby enabling the latter to stabilize the said primary elements in said slipping engagement.

2. A control mechanism constructed in accordance with claim 1 wherein said control device is a switch interposed in an electric circuit including a solenoid energizable thereby to operate said means to said control position.

3. In clutch controlling mechanism adapted to control a friction clutch having primary frictionally-engageable elements for transmitting drive-torque to an output shaft, comprising a secondary frictionally-engageable element arranged in parallel with respect to said primary elements, means operably related with said clutch for controlling disengagement of said primary and secondary elements, means operably related with said clutch for controlling re-engagement of said primary and secondary elements including means operable in response to torque transmittable by said secondary element graduated in accordance with the degree of initial contact effective between said primary and secondary elements during re-engagement thereof, for controlling relative movement of the latter toward full engagement, and means for varying the rate of engagement after the torque-responsive means become operative.

4. In clutch controlling mechanism adapted to control a friction clutch having primary frictionally-engageable elements for transmitting drive-torque, when engaged, to an output shaft, comprising a secondary frictionally-engageable element arranged in parallel with respect to said primary elements, means operably related with said clutch for controlling disengagement of said primary and secondary elements, means operably related with said clutch for controlling re-engagement of said primary and secondary elements including means operable in response to the torque transmittable by said secondary element graduated in accordance with the degree of initial contact effective between said primary and secondary elements during re-engagement thereof, for arresting said engaging control means and thereby establishing the said primary and secondary elements in slipping engagement.

5. In clutch controlling mechanism adapted to control a friction clutch having primary frictionally-engageable elements for transmitting drive-torque, when engaged, to an output shaft, comprising a secondary frictionally-engageable element arranged in parallel with respect to said primary elements, means operably related with said clutch for controlling disengagement of said primary and secondary elements, means operably related with said clutch for controlling re-engagement of said primary and secondary elements including means operable in response to the torque transmittable by said secondary element graduated in accordance with the degree of initial contact progressively effective between said secondary and primary elements during re-engagement thereof, for retarding said engaging control means and thereby controlling the rate of engaging movement of said primary and secondary elements toward lock-up engagement thereof.

6. In control mechanism for a friction clutch having a plurality of primary frictionally-engageable elements for transmitting drive-torque to an output shaft, and means operably related with said clutch for disengaging the clutch elements, the improvement which comprises: secondary frictionally-engeagable element arranged in parallel with respect to said primary elements; means operably related with said clutch for controlling re-engagement of said primary and secondary elements including torque-responsive means operable in response to initial force exerted by said engaging control means on said primary and secondary elements to re-engage the same sufficiently to establish slipping contact therebetween and thereby conditioning subsequent exertion of additional force by said engaging control means to fully engage said primary and secondary elements for co-rotation upon said torque-responsive means becoming operative to establish said primary and secondary elements in said slipping contact in response to limited torque force transmittable by said secondary element; and means operatively interrelated with said secondary element and said torque-responsive means for limiting the torque force transmittable by said secondary elements when engaged by said primary elements.

7. In control mechanism for a friction clutch having a plurality of primary frictionally-engageable elements adapted to transmit drive-torque to an output shaft, when engaged, and means operably related with said clutch for disengaging said clutch elements, the improvement which comprises: a secondary frictionally-engageable element arranged in parallel with respect to said primary elements; means operably related with said clutch for controlling re-engagement of said primary and secondary elements including torque-responsive means operable in response to limited torque force transmittable by said secondary element only to arrest relative engaging movement of said primary and secondary elements under control of said engaging control means; and means operatively interrelated with said secondary element and said torque-responsive means for limiting the torque force transmittable by said secondary element when engaged by said primary elements.

8. In control mechanism for a friction clutch having a plurality of primary frictionally-engageable elements adapted to transmit drive-torque to an output shaft, when engaged, and means operably related with said clutch for disengaging said clutch elements, the improvement which comprises: a secondary frictionally-engageable element arranged in parallel with respect to said primary elements; means operably related with said clutch for controlling re-engagement of said primary and secondary elements including torque-responsive means operable in response to limited torque force transmittable by said secondary element only, to retard relative engaging movement of said primary and secondary elements without interrupting such relative movement of the latter elements into lock-up engagement under influence of said engaging control means; and means operatively interrelated with said secondary element and said torque-responsive means for limiting the torque force transmittable by said secondary element when engaged by said primary elements.

9. In an automotive friction clutch having a plurality of primary drive and driven friction elements engageable to transmit drive-torque to an output shaft, and means operably related with said clutch for controlling disengagement of said friction elements, the improvement which comprises: a secondary friction element interposed in parallel with respect to said primary elements; a torque-responsive switch comprising a pair of relatively rotatable contact-carrying elements mounted on said output shaft; a tubular member encircling said output shaft and adapted to rotate one of said switch elements relatively to the other switch element; means for connecting the other switch element to said output shaft for co-rotation therewith; a normally preloaded spring reacting between said switch element to separate their respective contacts; a lost-motion connection characterized by limiting the relative movement between said switch elements effective to engage their respective contacts; a dog-clutch operably incorporated between said tubular member and said one switch element to impart co-rotational movement thereto and accommodate limited relative axial movement therebetween; an overload clutch operably incorporated between said tubular member and said secondary element, and which is characterized by automatic release in response to a predetermined torque force impressed on said secondary element to limit the torque force transmittable by the latter element when engaged by said primary elements to effect relative rotation of the one switch element with respect to the other switch element and thereby engaging their respective contacts.

10. In an automotive friction clutch having a driving member and a primary disc assembly engageable to transmit drive-torque to an output shaft, the improvement which comprises: a secondary driven member arranged in parallel with respect to said primary disc assembly and adapted to receive initail drive-torque applied by said driving member to said primary disc assembly; a tubular actuatable member encircling a portion of said output shaft, and frictionally connected at one end to said secondary driven member for limited co-rotational movement therewith; an outstanding flange defining the one end of said tubular member; a pair of diametrically opposed slots defining the other end of said tubular member; a friction overload release coupling having an annular clamp member to impinge said flanged end of said tubular member against the confronting face on said secondary driven member to provide said friction connection therebetween whereby rotation of said secondary driven member imparts corresponding limited co-rotational movement to said tubular member, means for clamping said clamp member to said secondary driven member; a torque-responsive switch unit having a fixed hollow housing, a pair of spaced rotatable contact-carrying elements in said housing; means for connecting one of said switch elements to said output shaft for co-rotation therewith, a hub-like element provided with an outstanding flange at one end and a pair of projections defining the other end, said projections being adapted to engage said end slots in said tubular member to lock said hub-like element thereto for co-rotation and accommodate relative axial movement therebetween, a lost-motion connection between said switch elements and comprising a plurality of pins fixed at one end to said flange on said hub-like element and projecting through complemental openings in the other of said switch element to lock the latter for co-rotation with said hub-like element therefore said tubular member, said pins projecting across the space between said switch elements into circumferentially spaced arcuate openings, respectively, processed in said one switch element whereby said pins engage one end of said openings to establish the normal separated contact relation of said switch elements; spring means including a normally preloaded spring operably disposed in the space between said switch elements and reacting between one of said pins and said one switch element to establish said normal relationship of said switch elements; energizable servo-mechanism for frictionally engaging said driving member and primary disc assembly and secondary driven member, to rotate said secondary member relatively to said primary disc assembly for actuation of said tubular member relative to said output shaft to effect relative rotation of said switch element from normal to contact-engaged relationship in opposition to said spring means; and control means for said servo-mechanism activatable in response to closure of said switch contacts for suspending operative energization of said servo-mechanism to that of establishing said driving member, primary driven disc and secondary driven member in slipping engagement only to precondition firm engagement thereon upon said control means being differently activated at will.

11. Mechanism for controlling engagement of a friction engaging device having primary frictionally-engageable drive and driven members arranged to provide for transmission of drive-torque to an output shaft, comprising means for applying engaging force to said primary members; a secondary driven member interposed in parallel with respect to said primary members for frictional engagement thereby; means operatively energizable for controlling said force applying means; control means for controlling operative energization of said energizable means; and a control device operable from normal to first control position for sensing initial contact of said primary and secondary members in response to limited torque transmission by said secondary member graduated in accordance with the degree of slipping engagement of said primary members, for controlling said control means to control operative energization of said energizable means and thereby enabling the latter means to stabilize the effectiveness of said force applying means to that of controlling said primary members in slippage engagement only.

12. Mechanism for controlling engagement of a friction engaging device having primary frictionally-engageable drive and driven members arranged to provide for transmission of drive-torque to an output shaft, comprising means for applying engaging force to said primary members; a secondary driven member interposed in parallel with respect to said primary members for frictional engagement thereby; means operatively energizable for controlling said force applying means; control means for controlling operative energization of said energizable means; and a control switch device operable from open to closed position for sensing initial contact of said primary and secondary members in response to limited torque transmission by said secondary member graduated in accordance with the degree of slipping engagement of said primary members, for controlling said control means to control operative energization of said energizable means and thereby enabling the latter means to stabilize the effectiveness of said force applying means to that of controlling said primary members in slipping engagement only.

13. Mechanism for controlling engagement of a friction engaging device having primary frictionally-engageable drive and driven members arranged to provide for transmission of drive-torque to an output shaft, comprising means for applying engaging force to said primary members; a secondary driven member interposed in parallel with respect to said primary members for frictional engagement thereby; means operatively energizable for controlling said force applying means; control means operable from normal to first-engaging control position for controlling operative energization of said energizable means; a control switch device operable from open to closed position for sensing initial contact of said primary and secondary members in response to limited torque transmission by said secondary member graduated in accordance with the degree of slipping engagement of said primary members, for operating said control means to first position to control operative energization of said energizable means and thereby enabling the latter means to stabilize the effectiveness of said force applying means to that of controlling said primary members in slipping engagement only; means operably incorporated between said secondary member and said switch device for automatically limiting the torque transmittable by the former member to the latter device; an energizable electric circuit including said switch device; means for energizing said circuit; and an electric solenoid interposed in said circuit and energizable thereby upon closure of said switch device to operate said control means to first position.

14. Mechanism for controlling engagement of a friction engaging device having primary frictionally-engageable drive and driven members arranged to provide for transmission of drive-torque to an output shaft, comprising means for applying engaging force to said primary members; a secondary driven member interposed in parallel with respect to said primary members for frictional engagement thereby; means operatively energizable for controlling said force applying means; control means for controlling operative energization of said energizable means; a control device operable from normal to first control position for sensing initial contact of said primary and secondary members in response to limited torque transmission by said secondary member graduated in accordance wth the degree of slipping engagement of said primary members, for controlling said control means to control operative energization of said energizable means and thereby enabling the latter means to stabilize the effectiveness of said force applying means to that of controlling said primary members in slipping engagement only; and frictionally operable means incorporated between said secondary member and said control device for automatically limiting the torque transmittable therebetween.

15. Mechanism for controlling engagement of a friction engaging device having co-rotatable first and second drive members, a primary driven member arranged in parallel interposition with respect to said drive members for frictional engagement therewith to provide for transmission of drive-torque to an output shaft, and an axially movable pressure member co-rotatable with said drive members for applying engaging pressure to said drive and driven members, comprising a secondary driven member arranged in parallel interposition with respect to said second drive member and said pressure member for frictional engagement therewith; means operatively energizable for moving said pressure member; control means for controlling operative energization of said energizable means; a control device operable from normal to first control position for sensing initial contact of said drive, primary and secondary members graduated in accordance with the degree of slipping engagement of said drive and primary members, for controlling said control means to control operative energization of said energizable means and thereby enabling the latter means to stabilize the effectiveness of said pressure member to that of controlling said drive and primary members in slipping engagement only; and frictionally operable means incorporated between said secondary member and control device for limiting the torque transmittable therebetween.

16. Mechanism for controlling engagement of a friction engaging device having co-rotatable first and second drive members, a primary driven member arranged in parallel interposition with respect to said drive members for frictional engagement therewith to provide for transmission of drive-torque to an output shaft, and an axially movable pressure member co-rotatable with said drive members for applying engaging pressure to said drive and driven members, comprising a secondary driven member arranged in parallel interposition with respect to said second drive member and said pressure member for frictional engagement therewith; means operatively energizable for moving said pressure member; control means operable from normal to first-engaging control position for controlling operative energization of said energizable means; a control switch device operable from open to closed position for sensing initial contact of said drive, primary and secondary members in response to limited torque transmission by said secondary member graduated in accordance with the degree of slipping engagement of said drive and primary members, for operating said control means to first position to control operative energization of said energizable means and thereby enabling the latter means to stabilize the effectiveness of said pressure member to that of controlling said drive and primary members in slipping engagement only; frictionally operable means incorporated between said secondary member and said control switch device for automatically limiting the torque transmittable therebetween.

References Cited by the Examiner

UNITED STATES PATENTS

| | | | |
|---|---|---|---|
| 2,277,554 | 3/1942 | McCoy | 192—56 |
| 2,362,418 | 11/1944 | Thompson | 192—.03 X |
| 2,528,585 | 11/1950 | Farkas et al. | 192—87 |
| 2,642,971 | 6/1953 | Hagenbook | 192—96 |
| 2,886,665 | 5/1959 | Binder | 200—61.46 |
| 2,893,526 | 7/1959 | Smirl | 192—3.5 |
| 2,918,154 | 12/1959 | Scherenberg et al. | 74—337 X |
| 3,129,300 | 4/1964 | Moyles | 200—61.46 |

DAVID J. WILLIAMOWSKY, *Primary Examiner.*

DON A. WAITE, *Examiner.*

B. W. WYCHE, *Assistant Examiner.*

UNITED STATES PATENT OFFICE
CERTIFICATE OF CORRECTION

Patent No. 3,251,439                                          May 17, 1966

Glenn T. Randol

It is hereby certified that error appears in the above numbered patent requiring correction and that the said Letters Patent should read as corrected below.

Column 1, line 44, for "dirver" read -- driver --; line 47, for "tester" read -- tested --; column 2, lines 14 and 30, for "member", each occurrence, read -- members --; column 3, lines 16 and 17, for "therefore" read -- therefor --; line 27, for "contacts" read -- contact --; same line 27, for "fixed" read -- rigid --; column 4, line 15, for "forms" read -- form --; line 30, for "drive" read -- driven --; line 50, for "opposed" read -- opposing --; line 65, for "28" read -- 28, --; line 66, for "spectively" read -- spectively, --; line 67, for "13," read 13 --; line 69, after "30" insert -- of --; column 6, line 23, for "hollow" read -- hollow, --; line 34, for "actuate" read -- actuating --; line 43, for "control" read -- controlling --; column 7, line 52, for "aforesaind" read -- aforesaid --; column 8, line 6, for "aind" read -- and --; line 47, for "are" read -- is --; column 9, lines 15 and 16, for "complete" read -- completing --; line 29, strike out "the", first occurrence; line 71, for "pending" read -- copending --; column 10, line 63, for "raise" read -- raising --; column 11, line 45, for "autamatic" read -- automatic --; column 12, line 66, for "facing" read -- facings --; column 13, line 7, for "restored" read -- resorted --; same line 7, for "of" read -- or --; column 15, line 17, for "element" read -- elements --; line 38, for "initail" read -- initial --; lines 66 and 67, for "element" read -- elements --; column 16, line 8, for "element" read -- elements --; column 18, line 35, before "frictionally" insert -- and --.

Signed and sealed this 12th day of September 1967.

(SEAL)
Attest:

ERNEST W. SWIDER                                        EDWARD J. BRENNER
Attesting Officer                                         Commissioner of Patents